United States Patent [19]

Choi

[11] Patent Number: 5,699,181
[45] Date of Patent: Dec. 16, 1997

[54] DEFORMABLE MIRROR DEVICE AND MANUFACTURING METHOD THEREOF

[75] Inventor: Bum-Kyoo Choi, Seongnam, Rep. of Korea

[73] Assignee: Samsung Electronics Co., Ltd., Kyungki-Do, Rep. of Korea

[21] Appl. No.: 637,601

[22] Filed: Apr. 25, 1996

[30] Foreign Application Priority Data

Jul. 27, 1995 [KR] Rep. of Korea ........... 95-22554

[51] Int. Cl.$^6$ .................................. G02B 26/00
[52] U.S. Cl. .................. 359/291; 359/846; 359/224
[58] Field of Search .................. 359/290, 291, 359/214, 224, 846, 223; 348/771; 340/815.4

[56] References Cited

U.S. PATENT DOCUMENTS

| | | | |
|---|---|---|---|
| 5,083,857 | 1/1992 | Hornbeck | 359/291 |
| 5,212,582 | 5/1993 | Nelson | 359/224 |
| 5,497,262 | 3/1996 | Kaeriyama | 359/223 |
| 5,583,688 | 12/1996 | Hornbeck | 359/291 |

OTHER PUBLICATIONS

Larry J. Hornbeck, "Current Status of the Digital Micromirror Device (DMD) for Projection Television Applications", Dec. 1993.

*Primary Examiner*—Loha Ben
*Attorney, Agent, or Firm*—Sughrue, Mion, Zinn, Macpeak & Seas, PLLC

[57] ABSTRACT

A deformable mirror device and a manufacturing method thereof, which decreases the possibility of damage to a substrate having an address scanning circuit and increases the efficiency of light reflection of a moving mirror. First and second moving mirrors and first and second posts are fabricated on a substrate. An address scanning circuit (SRAM) is fabricated on another substrate, independently. Finally, both the substrates are combined. The second post is vertically formed by sputtering after the second moving mirror is formed.

5 Claims, 5 Drawing Sheets

DEFORMABLE MIRROR DEVICE AND MANUFACTURING METHOD THEREOF

BACKGROUND OF THE INVENTION

1. Field of the Invention

The present invention relates to a deformable mirror device (DMD) and a manufacturing method thereof, and more particularly, to a DMD and a manufacturing method thereof which increases the efficiency of light reflection and decreases the likelihood of damage to a control circuit board to which the DMD is attached.

2. Description of the Related Art

A DMD, which is rotated by electrostatic force, for reflecting light beams, is generally applied to the screen of a high-definition television. Such a DMD is comprised of a plurality of reflection mirrors 1 which are connected to one another by torsional hinges 3 to rotate with respect to posts 2, as shown in FIG. 1. This type of DMD, however, employs a plurality of posts 2, thus lowering the reflectivity of light because the total mirror surface area is limited.

A method of manufacturing a DMD, which is disclosed in the U.S. Pat. No. 5,083,857, will be described with reference to FIGS. 2A through 2D. As shown in FIG. 2A, a static random access memory (SRAM) 502 and an oxide protection film 501 are sequentially formed on the surface of a substrate 503 including an address scanning circuit. Then, a first spacer layer 701 is formed on oxide protection film 501 to have a predetermined pattern of openings 702.

Thereafter, as shown in FIG. 2B, a torsional hinge 401 is formed, by a sputtering process, on the surface of first spacer layer 701 in predetermined pattern. An electrode 704 laving a hinge supporting post 406 is formed on the surface of hinge 401.

As shown in FIG. 2C, a second spacer layer 705 is formed on electrode 704 in a predetermined pattern. Then, a reflection mirror 200 having a reflection mirror supporting post 201 is formed on second spacer layer 705. Finally, first and second spacer layers 701 and 705 are removed, as shown in FIG. 2D. Reflection mirror 200 generally has a reflective surface formed by sputtering.

The DMD manufactured by the above process exhibits the following drawbacks. First, since SRAM 502, oxide protection film 501, first spacer layer 701, hinge 401, hinge supporting post 406, reflection mirror 200, and reflection mirror supporting post 201 are sequentially deposited on the surface of substrate 503, an error in fabrication of hinge 401 and reflection mirror 200 may result in damage to SRAM 502. Further, a convex portion is produced on the surface of mirror 200, proximate the convergent portion of the supporting post 201 and the reflection mirror 200, since supporting post 201 and reflection mirror 200 are integrally formed by sputtering, thereby lowering the efficiency of light reflection.

SUMMARY OF THE INVENTION

The present invention is intended to overcome the above problems. The object of the present invention is to provide a deformable mirror device and a manufacturing method thereof which increases the efficiency of light reflection and decreases the likelihood of damage to a control circuit board.

To achieve the above object, there is provided a deformable mirror device comprising a substrate having an address scanning circuit, a plurality of electrodes formed on the surface of the substrate, a first moving mirror rotatably disposed above the electrodes, a first post for supporting the first moving mirror between the electrodes and the first moving mirror, a second post formed on the surface of the first moving mirror, and a second moving mirror rotatably supported by the second post. The second post is vertically formed between the first moving mirror and the second moving mirror. According to one aspect of the present invention, the first and second moving mirrors are formed of aluminum.

To achieve the above object of the present invention, there is also provided a method for manufacturing a deformable mirror device comprising a substrate having an address scanning circuit, a plurality of electrodes formed on the surface of the substrate, a first moving mirror rotatably disposed above the electrodes, a first post for supporting the first moving mirror between the electrodes and the first moving mirror, a second post formed on the surface of the first moving mirror, and a second moving mirror rotatably supported by the second post, the method comprising the steps of, forming the second moving mirror on a base to have a predetermined pattern, forming the second post on the second moving mirror, forming the first moving mirror on the second post, forming the first post on the first moving mirror, forming the electrodes on the first post, and combining the substrate with an assembly of the first and second moving mirrors, the first and second posts, and the electrodes.

BRIEF DESCRIPTION OF THE DRAWINGS

The above object and advantages of the present invention will become more apparent by describing a preferred embodiment thereof with reference to the attached drawings in which.

DETAILED DESCRIPTION OF THE PREFERRED EMBODIMENTS

Figure 4:
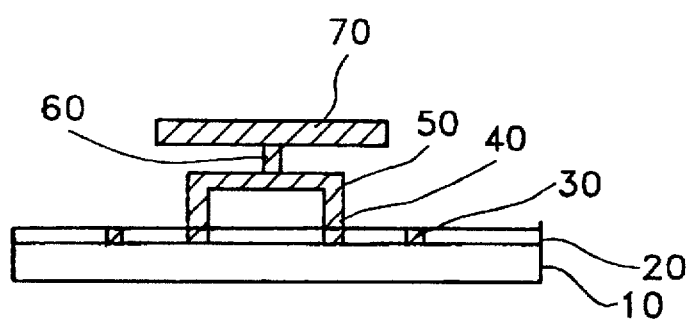
FIG. 4 is a schematic view of the DMD according to the present invention.

FIG. 4 illustrates a DMD according to the present invention. A thermal oxide film 20 and an electrode 30 of a predetermined pattern are formed on the surface of a substrate 10 which includes an address scanning circuit (not shown). A first post 40 is formed on electrode 30. A first moving mirror 50 is rotatably supported by first post 40 which serves as a torsional hinge. A second post 60 is formed on first moving mirror 50, and a second moving mirror 70 is rotatably formed supported on second post 60.

A primary feature of the present invention is that second post 60 is vertically formed between first moving mirror 50 and second moving mirror 70. Second post 60 may be formed on the lower surface of second moving mirror 70 by sputtering. Therefore, no concave portion is formed at the boundary of second post 60 and second moving mirror 70, unlike the prior art. Here, first and second moving mirrors 50 and 70 are formed of aluminum.

In the DMD as constituted above, when a predetermined potential is applied to first post 40 through electrode 30 of the address scanning circuit of substrate 20, first moving mirror 50 is rotated about a longitudinal axis, due to electromagnetic forces, in a known manner. Thus, second post 60 and second moving mirror 70 supported on first moving mirror 50 are also rotated. In other words, first moving mirror 50 serves as a torsional hinge for second moving mirror 70. Since no concave portion is produced at the boundary of second post 60 and second moving mirror 70, the efficiency of light reflection of second moving mirror 70 is increased as compared with the prior art.

A method for manufacturing the DMD according to the present invention will be described below.

Figure 1:
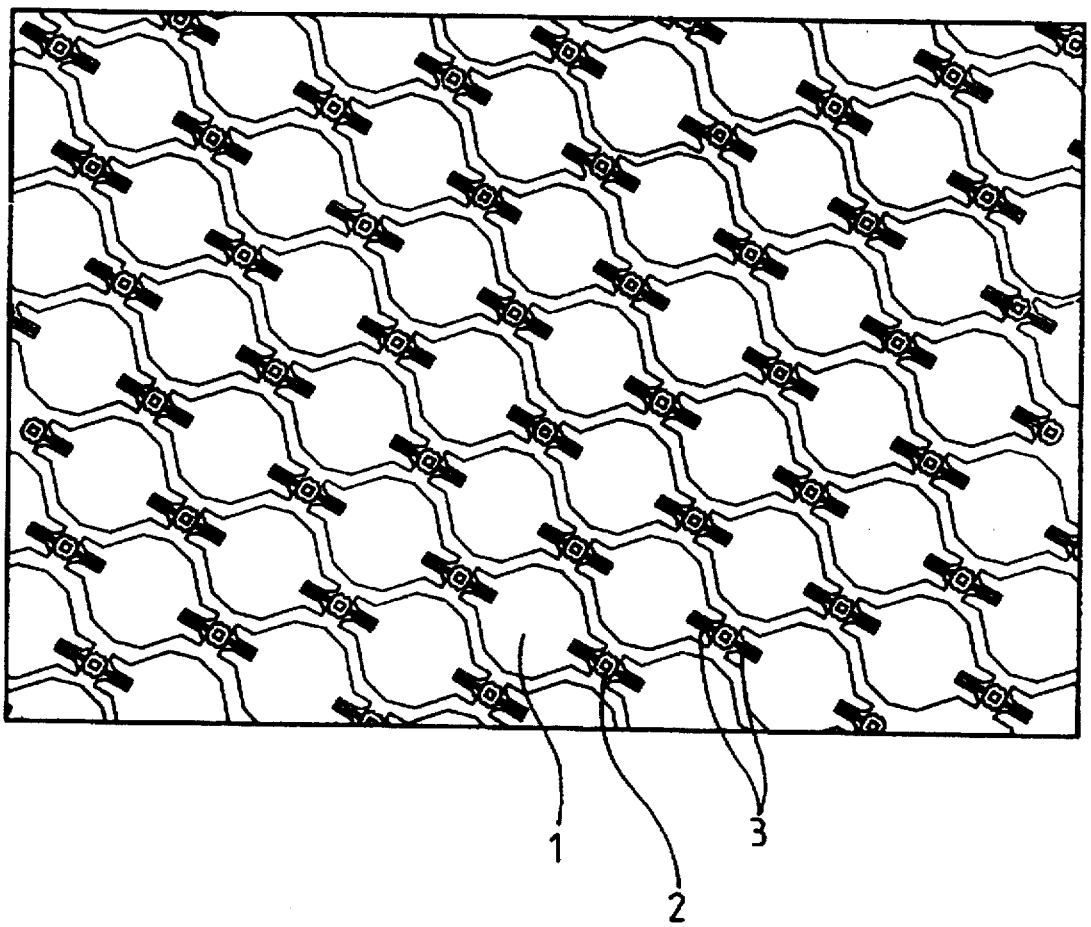
FIG. 1 is a schematic plan view of a conventional DMD.
Figure 2A:
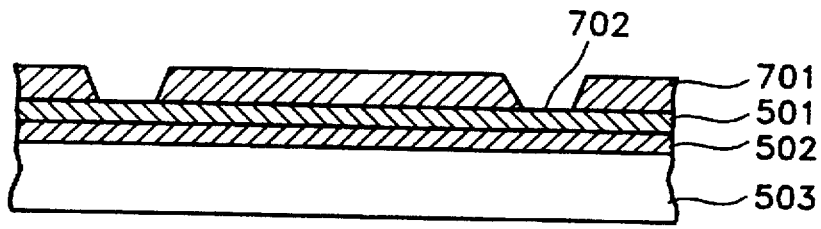
FIGS. 2A through 2D illustrate the steps for manufacturing the conventional DMD.
Figure 2B:
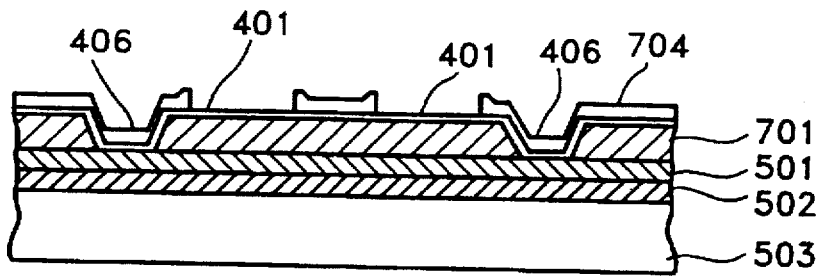
Figure 2C:
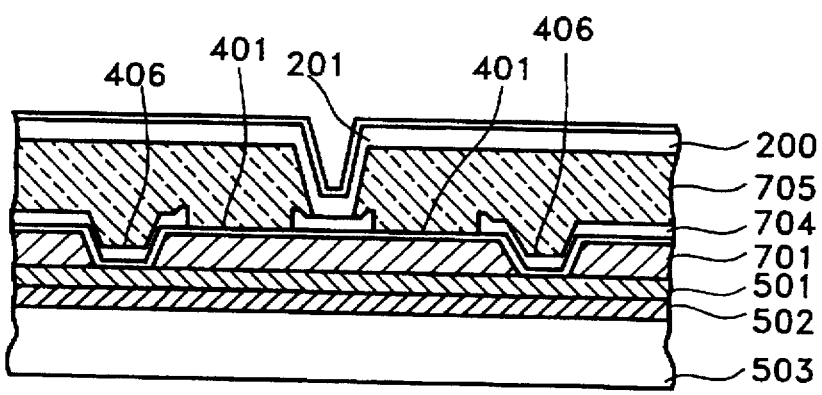
Figure 2D:
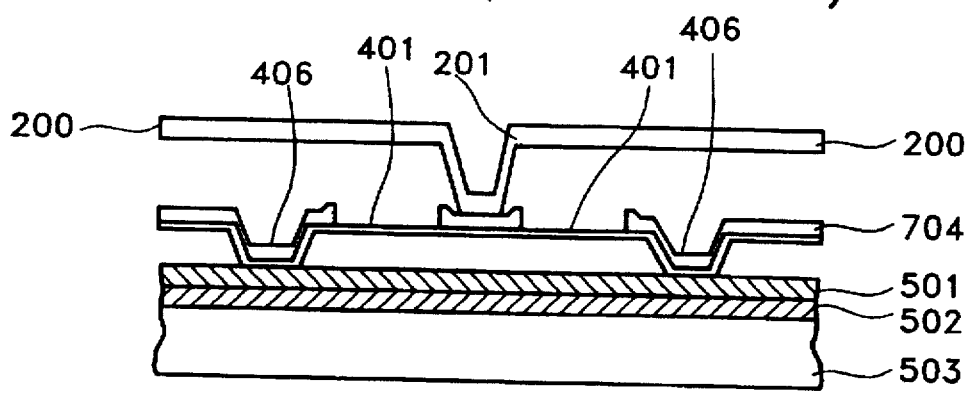
Figure 3A:
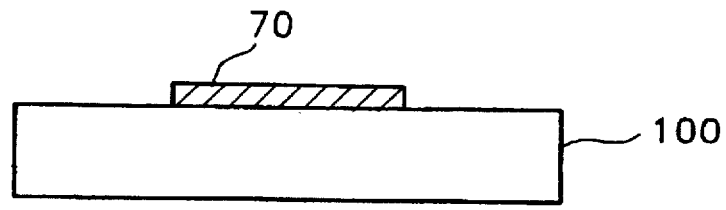
FIGS. 3A through 3N illustrate the steps for manufacturing a DMD according to the present invention.
Figure 3B:
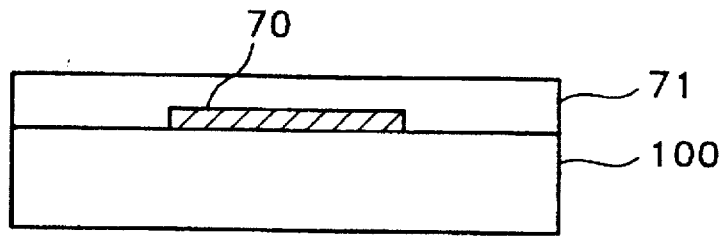
Figure 3C:
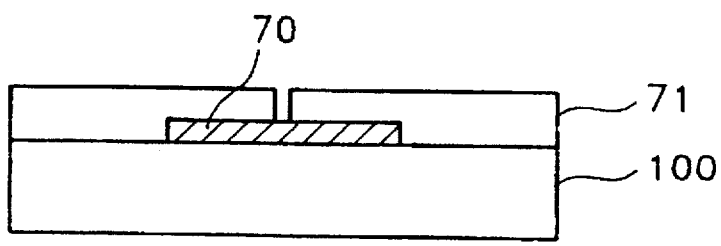
Figure 3D:
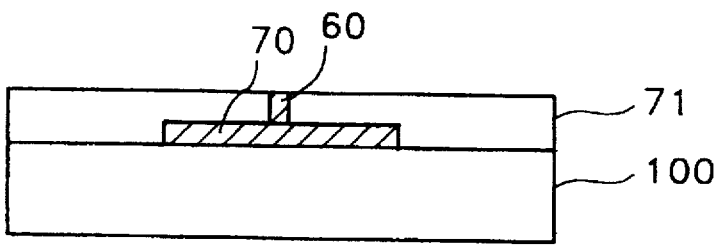

As shown in FIG. 3A, second moving mirror 70 is formed into a predetermined shape on a base 100 of silicon or glass. Second moving mirror 70 can be formed of aluminum by known evaporation or sputtering techniques. As shown in FIGS. 3B and 3C, a photoresist layer 71 is formed on base 100 and second moving mirror 70 to have a predetermined pattern. As shown in FIG. 3D, second post 60 is formed in the pattern of first photoresist layer 71 by sputtering or other known processes.

Figure 3E:
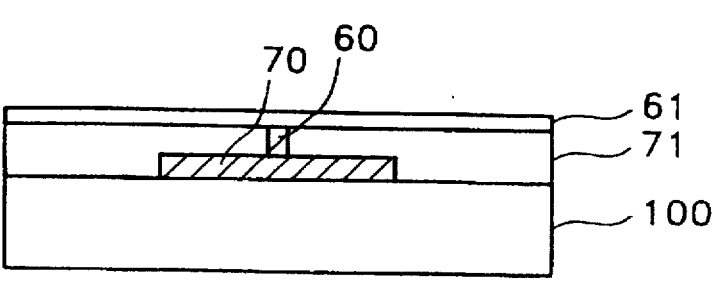
Figure 3F:
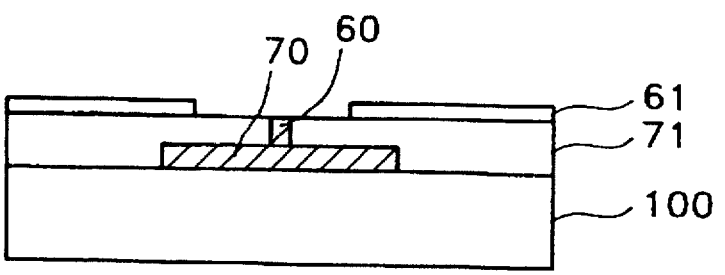
Figure 3G:
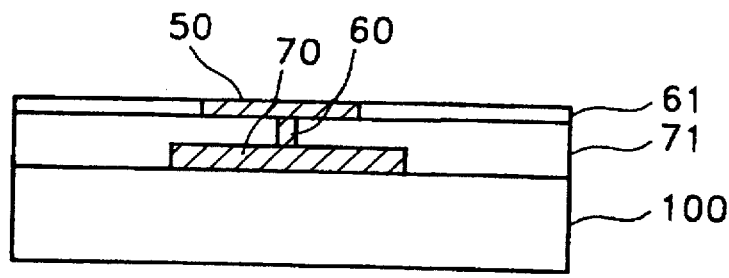

As shown in FIGS. 3E and 3F, a second photoresist layer 61 is formed on second post 60 and first photoresist layer 71 in a predetermined pattern. As Shown in FIG. 3G, first moving mirror 50 is formed in the pattern of second photoresist 61. First moving mirror 50 may be formed of aluminum by known evaporation or sputtering techniques. Second post 60 is thus vertically formed between first moving mirror 50 and second moving mirror 70.

Figure 3H:
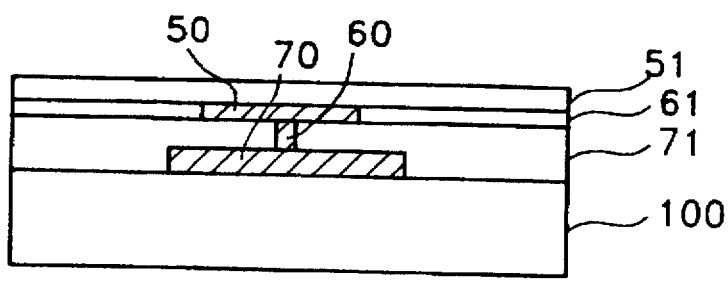
Figure 3I:
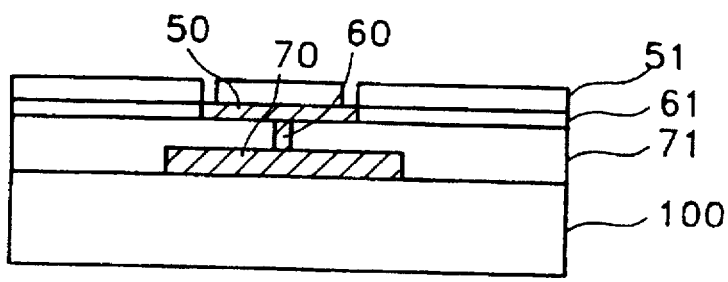
Figure 3J:
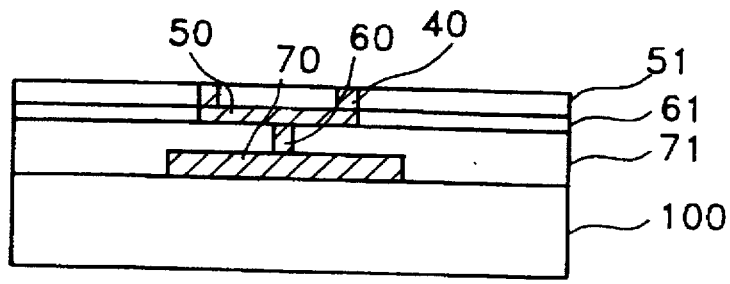

Thereafter, as shown in FIGS. 3H and 31, a third photoresist layer 51 is formed on first moving mirror 50 and second photoresist layer 61 in a predetermined pattern. As shown in FIG. 3J, first post 40 is formed in the pattern of third photoresist layer 51. First and second posts 40 and 60 are formed of a conductive metal.

Figure 3K:
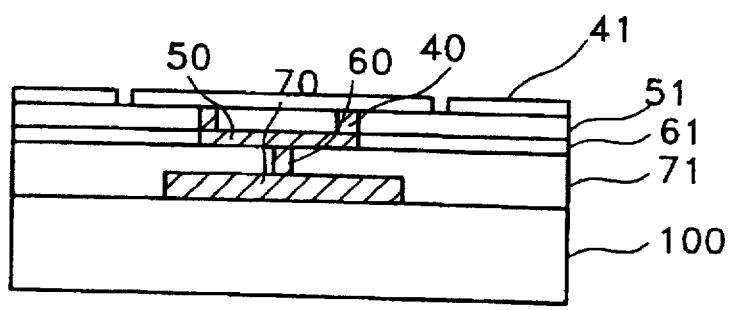
Figure 3L:
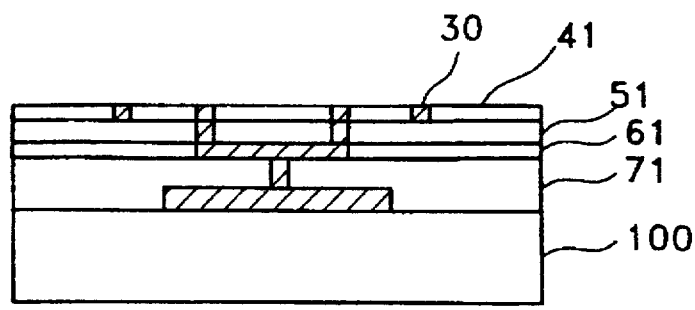

Then, as shown in FIG. 3K, a fourth photoresist layer 41 is formed on first post 40 and third photoresist layer 51 in a predetermined pattern. As shown in FIG. 3L, electrode 30 is formed in the pattern of fourth photoresist layer 41.

Figure 3M:
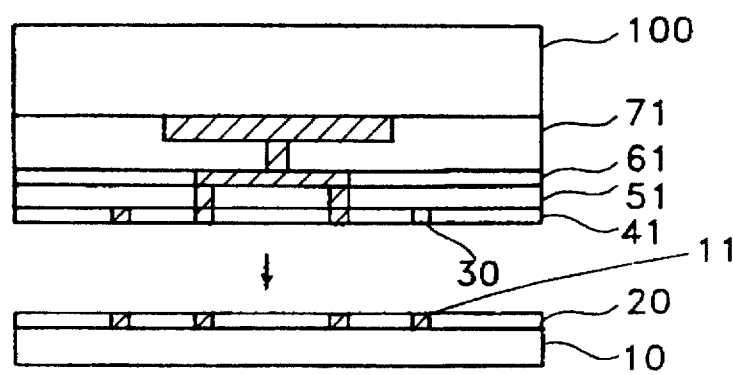
Figure 3N:
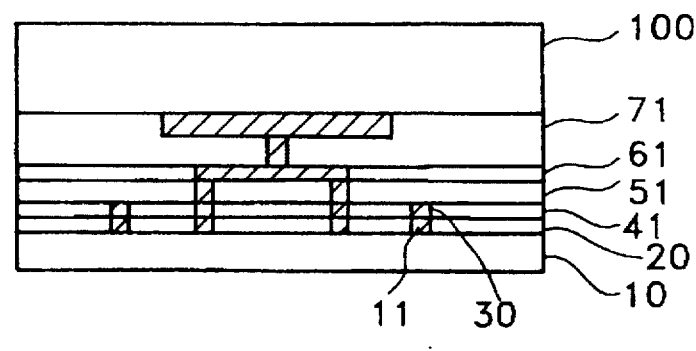

As shown in FIGS. 3M and 3N, first and second moving mirrors 50 and 70, first and second posts 40 and 60, and electrode 30 which are formed in the above steps are combined onto substrate 10 having the address scanning circuit, and electrode 11 and thermal oxide film 20 formed thereon. Finally, the photoresist layers are removed, and a base 100 is separated from the other elements, to thereby obtain a completed DMD as shown in FIG. 4.

The above method for manufacturing the DMD according to the present invention has the following advantages. First, damage of substrate 10 due to possible errors in fabrication of first and second moving mirrors 50 and 70, first and second posts 40 and 60, and electrode 30 are eliminated, since substrate 10 is fabricated independently of, and separately from, first and second moving mirrors 50 and 70, first and second posts 40 and 60, and electrode 30. Second, since no concave portion is produced on the boundary of second post 60 and second moving mirror 70, the efficiency of light reflection is increased as compared with conventional devices.

The structural elements of the invention can be constructed through known semiconductor fabrication techniques in the manner described above.

What is claimed is:

1. A method for manufacturing a deformable mirror device comprising a substrate having an address scanning circuit, a plurality of electrodes formed on the surface of said substrate, a first moving mirror rotatably disposed above said electrodes, a first post for supporting said first moving mirror between said electrodes and said first moving mirror, a second post formed on the surface of said first moving mirror, and a second moving mirror rotatably supported by said second post, the method comprising the steps of:

forming said second moving mirror in a predetermined pattern on a base;

forming said second post to extend from a surface of said second moving mirror;

forming said first moving mirror on said second post;

forming said first post on said first moving mirror;

forming said electrodes on said first post; and combining said substrate with an assembly of said first and second moving mirrors, said first and second posts, and said electrodes.

2. A method for manufacturing a deformable mirror device as claimed in claim 1, wherein said first and second moving mirrors are formed by sputtering aluminum.

3. A method for manufacturing a deformable mirror device as claimed in claim 1, wherein said first and second moving mirrors are formed by evaporating aluminum.

4. A method for manufacturing a deformable mirror device as claimed in claim 1, wherein said first and second posts are formed of a conductive metal.

5. A method for manufacturing a deformable mirror device as claimed in claim 1, wherein said second post is vertically extended from said second moving mirror and is formed by sputtering.

* * * * *